United States Patent
Gunnarsson et al.

(10) Patent No.: US 7,856,243 B2
(45) Date of Patent: Dec. 21, 2010

(54) POWER CONTROL FOR A RADIO TRANSCEIVER THAT USES INTERFERENCE CANCELLATION

(75) Inventors: Fredrik Gunnarsson, Linköping (SE); Bo Hagerman, Tyresö (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 573 days.

(21) Appl. No.: 11/951,113

(22) Filed: Dec. 5, 2007

(65) Prior Publication Data

US 2009/0149134 A1      Jun. 11, 2009

(51) Int. Cl.
H04B 7/00 (2006.01)
H04Q 7/20 (2006.01)

(52) U.S. Cl. ............. 455/522; 455/423; 455/13.4; 455/69; 455/127.1

(58) Field of Classification Search ............. 455/423, 455/13.4, 522, 68, 69, 127.1
See application file for complete search history.

(56) References Cited

U.S. PATENT DOCUMENTS

| | | | |
|---|---|---|---|
| 5,491,837 A * | 2/1996 | Haartsen | 455/62 |
| 5,898,750 A | 4/1999 | Laakso et al. | |
| 5,982,807 A * | 11/1999 | Snell | 375/146 |
| 6,137,451 A | 10/2000 | Sawahashi et al. | |
| 6,473,451 B1 | 10/2002 | Seki et al. | |
| 6,609,008 B1 | 8/2003 | Whang et al. | |
| 2002/0021682 A1* | 2/2002 | Ariyoshi et al. | 370/335 |
| 2004/0229570 A1 | 11/2004 | Matsumura | |
| 2005/0195924 A1 | 9/2005 | Chen et al. | |
| 2006/0171478 A1 | 8/2006 | Schotten et al. | |
| 2007/0195734 A1 | 8/2007 | Das et al. | |

FOREIGN PATENT DOCUMENTS

| | | |
|---|---|---|
| WO | WO 2006/081875 | 8/2006 |
| WO | WO 2007/008166 | 1/2007 |

OTHER PUBLICATIONS

International Search Report and Written Opinion mailed Jul. 3, 2009 in corresponding PCT Application PCT/SE2008/051175.
International Application No. PCT/SE2007/000943, filed Oct. 26, 2007, Hagerman et al.
International Application No. PCT/SE2007/000942, filed Oct. 26, 2007, Hagerman et al.
International Preliminary Report on Patentability mailed Jun. 8, 2010 in corresponding PCT Application PCT/SE2008/051175.

* cited by examiner

*Primary Examiner*—Tuan A Pham
(74) *Attorney, Agent, or Firm*—Nixon & Vanderhye P.C.

(57) ABSTRACT

A signal power associated with a signal received in a current time period is determined. The determined signal power is combined with a predicted effective interference to form a predicted signal-to-interference indicator. The predicted signal-to-interference indicator is compared to a target signal-to-interference indicator. One or more transmit power control commands are generated based on the comparison. In one example embodiment, the predicted effective interference is based on an effective interference estimated for a previous time period. In another example embodiment, the predicted effective interference is based on interference contributions estimated in a current time period and a predicted interference cancellation efficiency. The predicted interference cancellation efficiency is based on the estimated interference cancellation efficiency for a previous time period. The technology is particularly useful in receivers that use interference cancellation and achieves excellent transmit power control performance both in terms of accuracy and speed.

27 Claims, 10 Drawing Sheets

POWER CONTROL FOR A RADIO TRANSCEIVER THAT USES INTERFERENCE CANCELLATION

TECHNICAL FIELD

The technology described here relates to cellular radio communications, and more particularly, to generating more accurate and reliable power control commands from a radio transceiver that uses interference cancellation (IC).

BACKGROUND

Code Division Multiple Access (CDMA) is a multiple access method based on spread spectrum used in cellular communication systems. Other access techniques used in cellular communication systems include Frequency Division Multiple Access (FDMA), Time Division Multiple Access (TDMA), and more recently, Orthogonal Division Multiple Access (OFDM). In CDMA, the narrow band data signal of a user is spread across a relatively wide frequency band using a spreading code having a broader bandwidth than the data signal. Typically, many users transmit simultaneously using that same frequency band. An individual spreading code is also used on each connection between the base station and the mobile station so that individual user signals may be distinguished from each other at a receiver based on the user's spreading code. Mutually orthogonal spreading codes are desirable because they do not correlate with each other.

Correlators or matched filters in CDMA receivers are synchronized with the desired signal identified by spreading code. The received data signal is returned in the receiver onto the original band by despreading it using the same spreading code as in the transmitter. The received data signals spread by some other spreading code do not correlate well and appear as noise from the point of view of the desired signal. The aim then is to detect the signal of the desired user among several interfering signals. In practice, the spreading codes are not completely non-correlated, and the signals of other users complicate the detection of the desired signal by distorting the received signal. This interference users cause each other is termed multiple access interference.

The mutual access interference caused by simultaneous users is a key factor affecting the capacity of a CDMA cellular communication system. The interference may be reduced by attempting to keep the transmission power levels of mobile stations (sometimes referred to as mobile terminals or user equipments (UEs)) as low as possible using transmit power control. The power control may be based on some parameter measured or calculated from a received transmission, such as the received power, the signal-to-noise ratio, the signal-to-interference ratio, or other quality parameter. The capacity of the CDMA system is optimal if the base station receives signals from all mobile stations at the same power level. But achieving both accurate and fast power control is difficult in practice, particularly if interference cancellation is used. Power control and interference cancellation affect each other, and therefore, should be considered together. If a transmit power control procedure does not take into account the interference cancellation used by a receiver which improves the quality of the signal in the receiver, then the power control may wrongly set mobile transmit power levels higher than they should be, unnecessarily reducing system capacity. See commonly-assigned US 2002/0021682 A2.

A specific example of this problem can be found in the context of 3G cellular systems. In the 3GPP release 99, the radio access network (RAN) controls resources and UE mobility. Resource control includes admission control, congestion control, channel switching (roughly changing the data rate of a connection). A dedicated connection is carried over a dedicated channel DCH, which is realized as a DPCCH (Dedicated Physical Control Channel) and a DPDCH (Dedicated Physical Data Channel). The inner loop transmit power control tries to maintain a DPCCH signal-to-interference (DPCCH_SIR) level equal to a DPCCH_SIR target regularly updated by outer loop power control, which ensures that the DPDCH is operating at the correct power level (by monitoring the transport block error statistics). The DPDCH power is given by a power offset relative the DPCCH power level. These power offsets are configured during setup of the DCH radio bearer, either by signaling a power offset per transport format or by signaling the power offset of one transport format, and the other power offsets are obtained in the UE via an interpolation/extrapolation procedure. The power offsets may be updated using reconfiguration procedures in the radio access network.

Evolving 3G standards decentralize decision making, and in particular, the control over the short term data rate of the user connection. The uplink data is then allocated to an enhanced dedicated channel (E-DCH), which is realized as an E-DPCCH for data control and an E-DPDCH for data. They are used only when there is uplink data to send. An uplink scheduler (which is located in the base station or the Node B in the evolved standard) determines which transport formats each UE can use over the E-DPDCH. Inner loop, fast power control operates as for normal DCH's, while a slower, outer loop power control adjusts the DPCCH_SIR target to ensure that the E-DPDCH is operating at the correct power level (by monitoring a number of retransmissions in the receiver). Similar to the DCH case, the E-DPCCH and the E-DPDCH power levels are given by power offsets relative the DPCCH power level. These power offsets are configured during setup of the radio bearer either by signaling a power offset per transport format, or by signaling the power offset of one transport format, and the other power offsets are obtained in the UE via an interpolation/extrapolation procedure. Again, the power offsets may be updated using reconfiguration procedures in the radio access network.

Enhanced uplink transmissions from UEs including higher order modulation motivates use of advanced receivers in base stations to more fully exploit the transport formats allowing the highest data rates. Advance receivers will likely use some form of interference cancellation (IC) as mentioned above. One popular form of interference cancellation is successive interference cancellation (SIC) where interference is canceled successively by considering one user's received signal at the time, gradually cancelling more and more interference with the increasing number of considered user signals. In one-stage interference cancellation, one user's received signals are considered, detected, regenerated, and subtracted before detecting and decoding the remaining user signals. The first users processed typically include high data rate users which significantly contribute to the total received signal power. Decoding the user signals after the one-stage interference cancellation is easier and more accurate because of the subtracted interference. Another form of interference cancellation is parallel interference cancellation (PIC) where some or all UE signals are detected in parallel, and corresponding signals are regenerated in an iterative procedure, optimally by considering the channels, correlations, and data of all users and then solving an optimization problem. In response to the reduced interference, lower block error rates or fewer retransmissions are usually detected, and in response thereto, the DPCCH_SIR target level used in outer loop power control is lowered.

Outer loop power control (OLPC) can be slow to converge when changing from one DPCCH_SIR target level to another, which means that if the receiver performance changes rapidly over time, then the outer loop power control will have problems following these changes. Consequently, the gains of the advanced receiver might not be fully utilized in terms of reduced load. Furthermore, a potential concern is whether advanced receivers at a base station can be used to achieve higher loads since outer loop power control might react too slowly, which may cause instabilities in the uplink.

When any kind of interference cancellation procedure is employed, the signal produced after cancellation is delayed by the interference cancellation processing time L. As a result, determining the signal-to-interference ratio (SIR) used in inner loop fast power control is also delayed by the time L. Yet, inner loop uplink power control requires a SIR estimate before interference cancellation in order to be able to send a power control command with a minimum delay to reduce power control performance degradation caused as delays increase.

One possibility is to estimate DPCCH SIR before interference cancellation as is done in U.S. Pat. No. 5,898,740. The validity of that estimate can be questioned because it will be subject to more interference, but the additional processing delay L is avoided. Still, since DPCCH and E-DPDCH are subject to different amounts of interference, suitable power offsets depend on the interference cancellation efficiency which may change over time. Furthermore, cells capable of cancelling interference need different power offsets compared to cells which are not capable of cancelling interference. This means that one set of power offsets is not generally applicable. Consequently, power offset procedures in 3G WCDMA systems are based on the false assumption that both the DPCCH and for example the E-DPDCH experience the same interference.

SUMMARY

These and other problems are overcome by the technology described below. A signal power associated with a signal received in a current time period is determined. The determined signal power is combined with a predicted interference that is predicted based on an interference estimated for a previously received signal received in a previous time period to determine a predicted signal-to-interference indicator. The predicted signal-to-interference indicator is compared to a target signal-to-interference indicator. One or more transmit power control commands are generated based on the comparison. The technology is particularly useful in receivers that use interference cancellation and achieves excellent transmit power control performance both in terms of accuracy and speed.

In one non-limiting example implementation, the radio receiver uses interference cancellation. During the current time period, interference cancellation is performed on the received signal for the current time period. An estimated signal-to-interference indicator is determined based on the received signal after interference cancellation for the current time period. The estimated signal-to-interference indicator and the determined received signal power are combined to determine an effective interference estimate for the current time period. The effective interference estimate for the current time period is then used as the predicted interference for a next time period.

In this example implementation, a sequence of effective interference estimates is preferably stored for multiple time periods. The sequence of effective interference estimates for multiple time periods is then used to calculate the predicted effective interference for a next time period. If desired, a model can be generated using a sequence of effective interference estimates for multiple time periods, and the model used to predict the effective interference for a next time period. An example option is for the predicted effective interference for the current time period and the determined received signal power for the current time period to be combined to determine the predicted signal-to-interference indicator for the current time period in accordance with a first function. The estimated signal-to-interference indicator for the previous time period and the determined received signal power for the previous time period may be combined in accordance with a second function to determine the effective interference of the previous time period.

As non-limiting examples, the predicted signal-to-interference indicator may be determined by dividing the determined signal power by the predicted effective interference. The predicted signal-to-interference indicator may include one of the following: predicted signal-to-interference ratio (SIR), predicted signal-to-interference plus noise ratio (SINR), and predicted carrier-to-interference ratio (C/I). One example application for the technology is in a base station that operates in a cellular radio communications system.

Another non-limiting example implementation is described where the radio receiver also uses interference cancellation. During the current time period, interference cancellation is performed on the received signal for the current time period. An estimated residual interference fraction (RIF) indicator is determined based on the interference estimate of the signal before interference cancellation and on the interference estimate of the signal after interference cancellation for the current time period. The residual interference fraction indicator corresponds to the fraction of the interference that remains after interference cancellation for the signals that are considered in the interference cancellation process. The residual interference fraction indicator estimate for the previous time period is then used in combination with one or more interference estimates before interference cancellation for the current time period to predict the effective interference for the current time period. An example option is for the predicted effective interference for the current time period and the determined received signal power for the current time period to be combined to determine the predicted signal-to-interference indicator for the current time period in accordance with a first function. As a non-limiting example, the predicted signal-to-interference indicator may be determined by dividing the determined signal power by the predicted effective interference.

In example implementations, the accuracy of the described predicted effective interference value for the next time period can be evaluated when the corresponding estimated value for the next time period is available. The evaluated accuracy for the next time period can be used to adapt the calculation of the predicted value for subsequent time periods.

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs). It will be apparent to one skilled in the art that other embodiments may be practiced apart from the specific details disclosed below.

Figure 1:
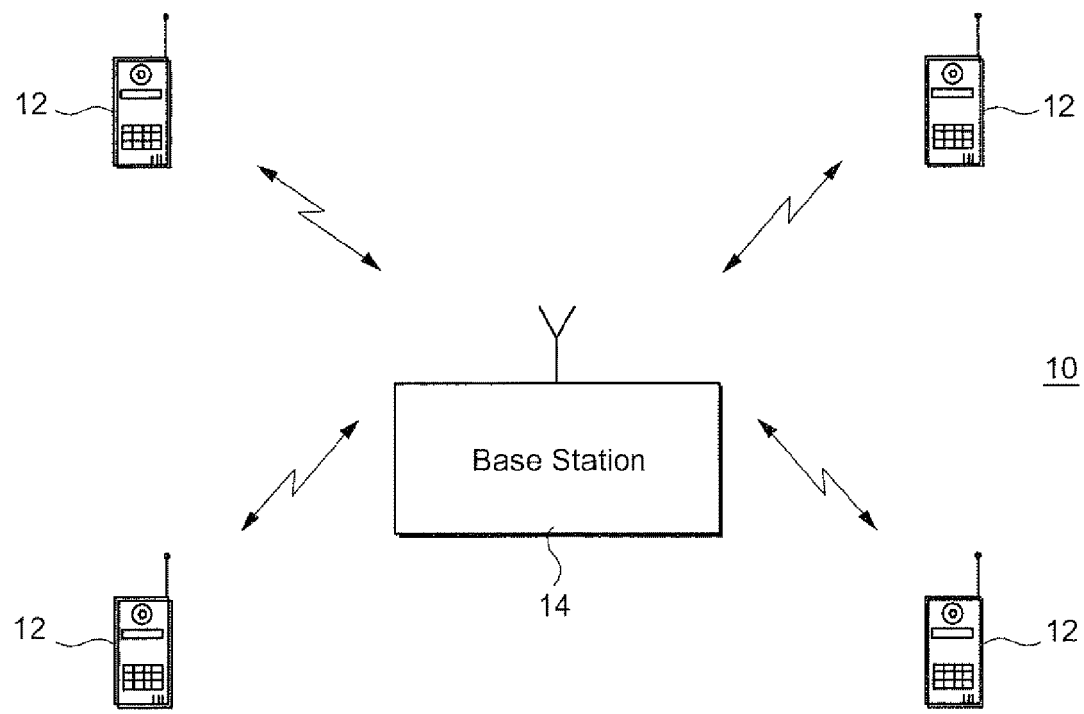
FIG. 1 illustrates an example simplified mobile radio communication system.

FIG. 1 illustrates an example simplified mobile radio communication system 10 including a base station 14 that provides service in one or more cell areas and communicates with mobile stations or UEs 12 in cell areas. The UEs transmit on the same frequency to the base station 14 which distinguishes their transmissions using a different spreading code assigned to each transmitting UE. As described in the background, the UE signals interfere with each other. In the base station receiver, the power level of each received uplink UE signal is measured and used in a process that results in an appropriate power control command being sent to each UE. The base station receiver 14 also uses some type of interference cancellation system to reduce multiple access interference.

Figure 2:
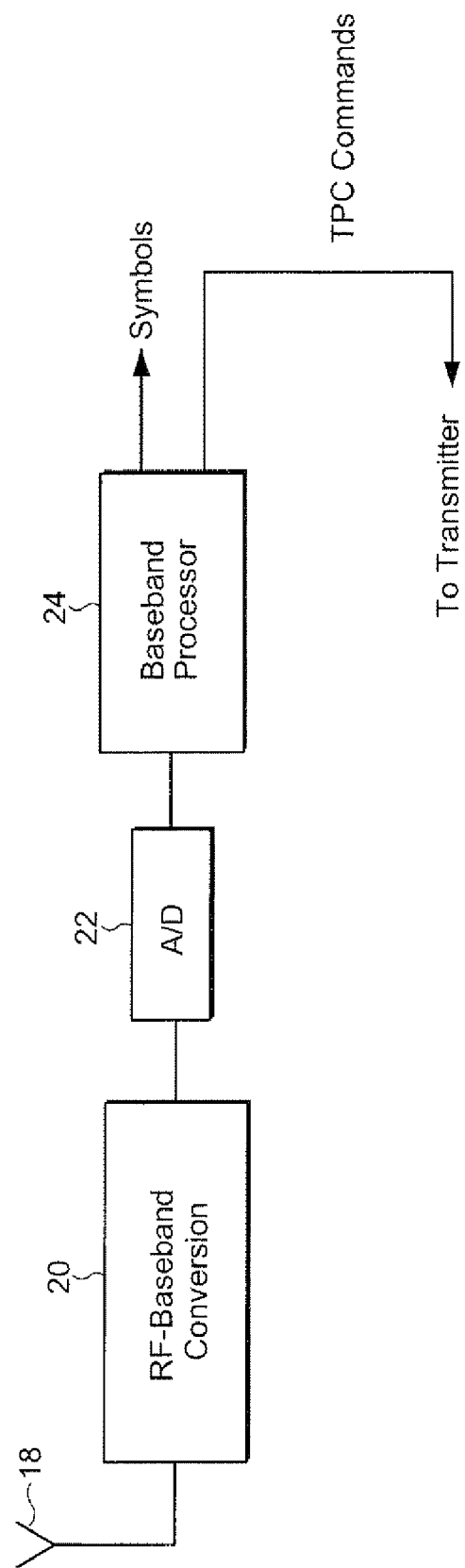
FIG. 2 is a function block diagram of an example radio transceiver for use in system that uses transmit power control (TPC)

FIG. 2 illustrates a simplified function block diagram of a receiver in which the technology in this case may be used. In the non-limiting example used throughout the description, the receiver is set in the context of a base station, but such a receiver could be used in a mobile radio or ill other types of radios. The receiver 16 includes an antenna 18 through which a received signal is applied to a radio frequency (RF)-to-baseband conversion block 20. The baseband signal is sampled in an analog-to-digital (A/D) converter 22. The digital signal is then processed in a baseband processor 24 where interference cancellation and detection of the received signal are carried out. The baseband processor 24 ultimately produces decoded symbols that correspond to the transmitted symbols as well as transmit power control (TPC) commands sent to control the transmit power level of the mobile radios.

The baseband processor 24 performs operations on the received signal that allows a rapid but reasonably accurate prediction of a signal-to-interference indicator for the received signal so that fast power control can be accomplished without having to wait for interference cancellation to be completed for the information being processed in a current time period. However, interference cancellation is performed on the received signal so that a predicted effective interference for the next time period produces a more accurate signal-to-interference indicator that takes into account interference cancellation. Since the effective interference likely does not change much from one short time period to the next, the predicted effective interference will likely be an accurate estimate.

The described prediction of the signal-to-interference indicator can be used together with any kind of interference cancellation scheme. For example, successive interference cancellation may be used where the baseband processor 24 processes the received transmission so that the signals are demodulated in a certain order, typically in order of magnitude, and then regenerated and removed from the received transmission. The next signal is then processed in the same way until all the signals have been processed. A related scheme is one-stage interference cancellation, where one group of users is decoded first, the corresponding signals are regenerated and subtracted, before considering the remainder of the users. Multi-stage or parallel interference cancellation, for example, may also be used in which multiple users to be received are processed in parallel. The symbol estimates are adjusted iteratively by repeating the reception procedure after the interference estimates have been reduced. Similarly, estimates of power control parameters may be adjusted iteratively.

Accordingly, the technology in this case generates relevant and timely power control commands—despite interference cancellation processing delay—by using a predicted, effective interference power estimate. The technology may be used with any interference cancellation method or power control procedures.

Figure 3:
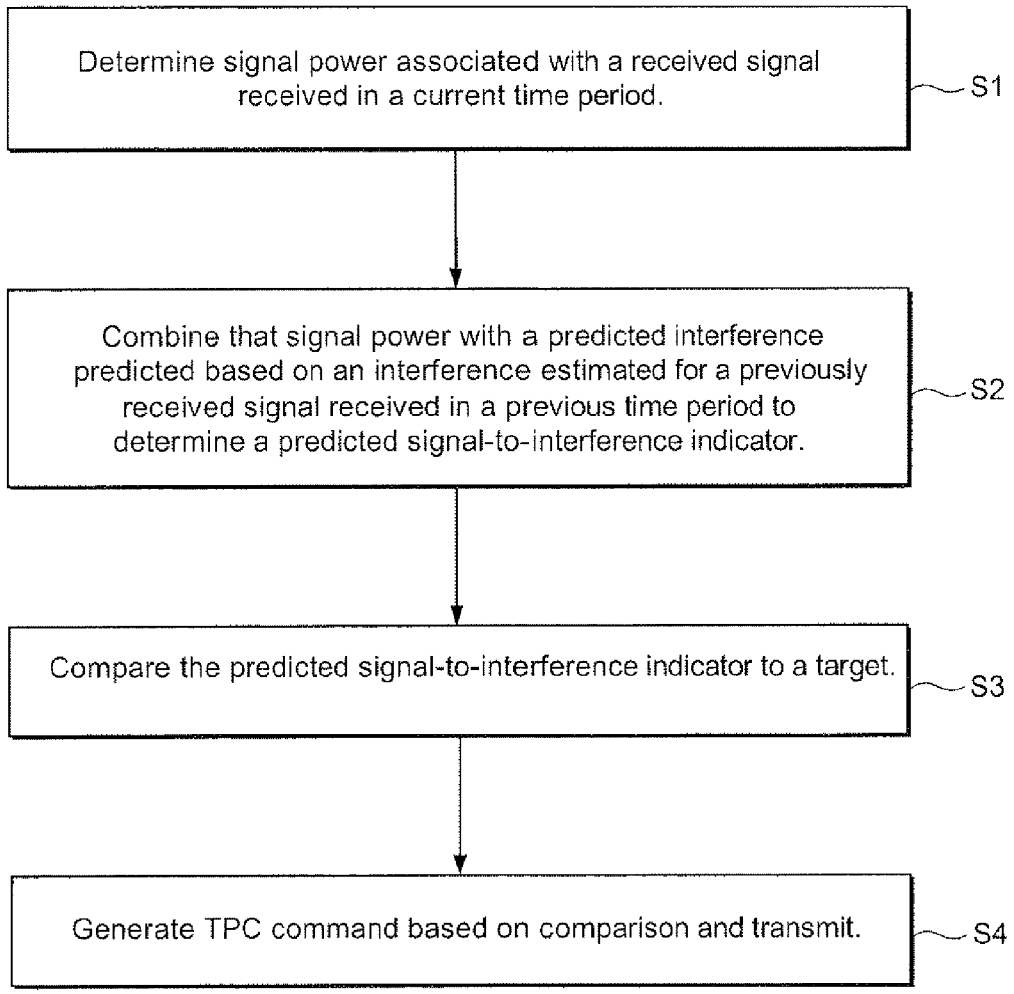
FIG. 3 is flowchart illustrating non-limiting, example procedures for a radio transceiver that uses interference cancellation (IC) and is part of a radio communications system that uses transmit power control (TPC)

Reference is made to the flowchart diagram in FIG. 3 that illustrates non-limiting, example procedures for a radio transceiver that uses interference cancellation (IC) and is part of a radio communications system that uses transmit power control (TPC). A signal power associated with a received signal received in a current time period is determined (step S1). The time period can be any suitable time period, e.g., a fraction of a time slot, a full time slot, etc. The determined signal power is combined with a predicted effective interference which is predicted based on an effective interference estimated for a previously received signal received in an earlier time period to determine a predicted signal-to-interference indicator (step S2). The predicted signal-to-interference indicator is compared to a target signal-to-interference indicator (step S3). A transmit power control command is then generated based on the comparison (step S4).

Figure 6:
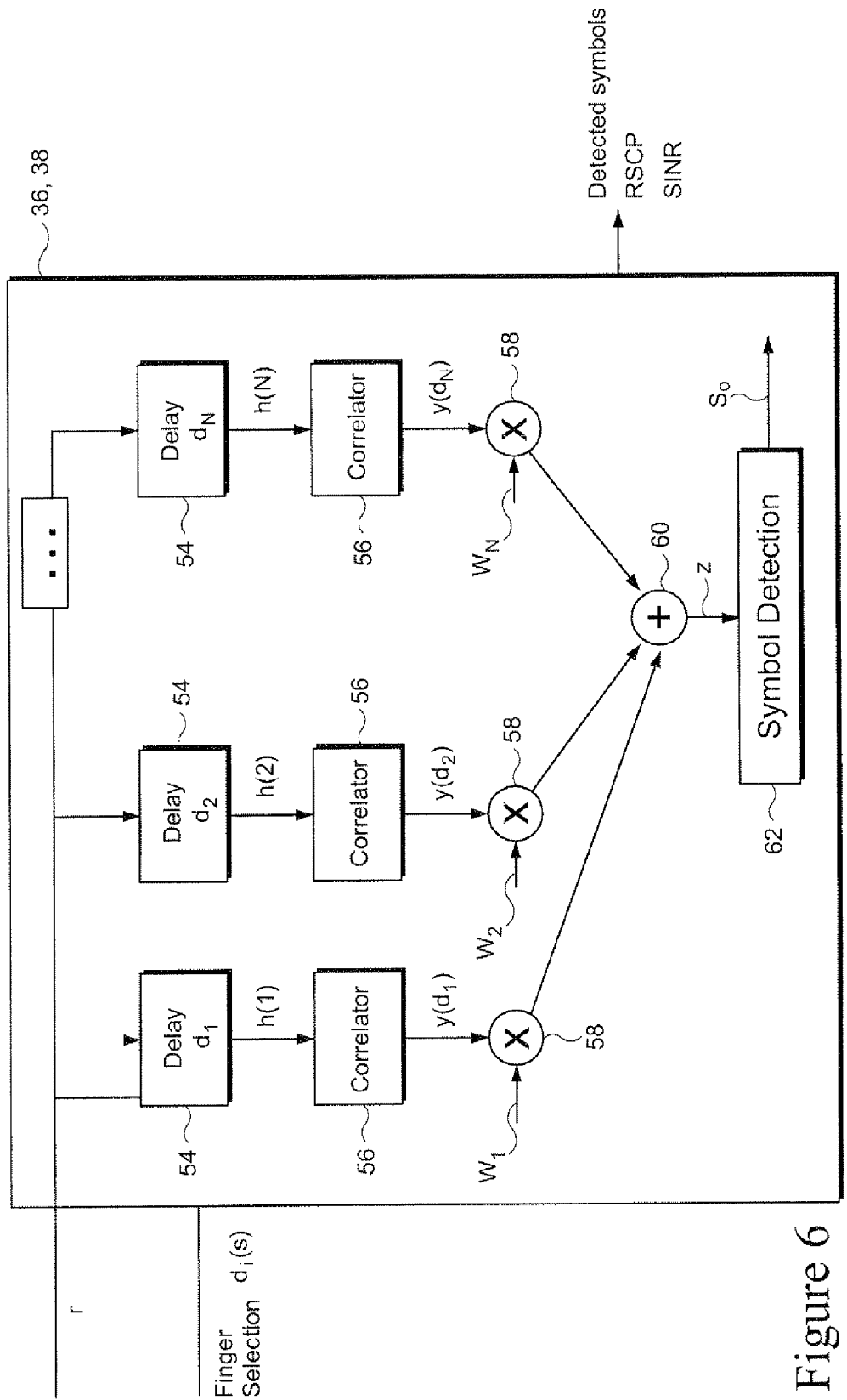
FIG. 6 is non-limiting example function block diagram of a RAKE receiver that may be used in the radio transceivers shown in FIG. 5 and in FIG. 9.

Baseband processor 24 includes a RAKE receiver. FIG. 6 illustrates conceptually a RAKE receiver or a Generalized RAKE receiver 36, 38. The RAKE receiver is so named because of its analogous function to a garden rake. Each "finger" effectively collects bit or symbol energy similarly to how tines on a rake collect leaves. More specifically, each finger includes a correlator 56 that correlates a different delay 54 $d_i$, where $i=1, \ldots, N$, of the received signal r with the spreading waveform of a received UE signal. Different numbers of fingers may be allocated to the received signals from multiple antennas, and the number of allocated fingers may be different from symbol to symbol. A finger selector (not shown) selects an appropriate number of fingers and associated delays $d_i$. The different finger outputs after correlation $y(d_i)$ with the spreading waveform are weighted in combiner 58 using weights $w_i$ and combined in a combiner 60 to obtain a decision statistic z from which the symbols so are detected by a symbol detector 62. The selected fingers and the weights depend on whether the receiver is a RAKE or a generalized RAKE receiver. In case of a RAKE receiver, the finger delays are identical to estimated channel tap delays based on an assumption of independent interference, while in case of a G-RAKE, more fingers than channel taps are typically allocated.

One factor that can be used when selecting G-RAKE fingers is to find the set of fingers that maximizes the signal-to-interference ratio (SIR) of the decision variable z. If the signal components after correlation $y(d_i)$ are gathered in a vector y, the finger output is gathered in a vector h, and $s_o$ denotes the symbol to be decoded, then an impairment vector u is defined as:

$$y=hs_o+u$$

where u is assumed Gaussian with a zero-mean and a covariance matrix $R_u$. The signal-to-interference ratio (SIR) of a decision statistic $z=w^H y$ can be expressed as:

$$SIR=(w^H h h^H w)/(w^H R_u w)$$

The SIR according to the definition above is likely different from a SIR obtained as the ratio between the signal power and the interference power. The interference power can be computed as the sum of all interference contributions plus noise, or alternatively, the total received power at the base station minus the desired signal power. In theory, the G-RAKE weights should be selected according to $w=R_u^{-1} h$.

Furthermore, the received signal power level, such as the received signal code power (RSCP) in a spread spectrum-based system, can be calculated as the sum of the finger output z. Uplink inner loop power control is traditionally based on uplink received signal code power (RSCP) or on uplink received signal-to-interference ratio (SIR).

Figure 4:
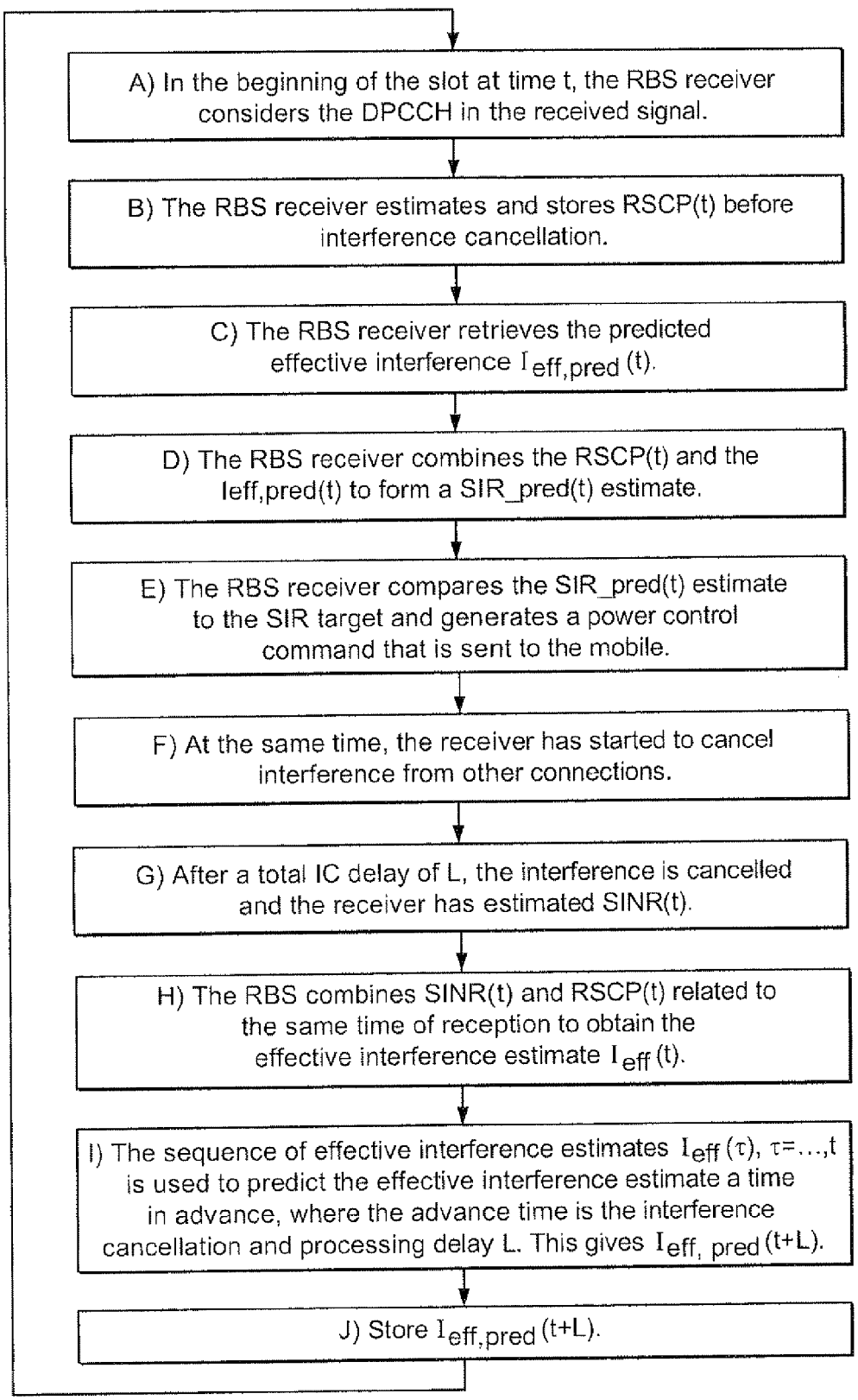
FIG. 4 is a detailed flowchart illustrating non-limiting, example procedures for a radio transceiver that uses interference cancellation (IC) and is part of a radio communications that uses transmit power control (TPC)

The SIR in a spread spectrum-based system may also be defined as RSCP/ISCP*SF, where ISCP is the Interference Signal Code Power and SF is the spreading factor of the channel. ISCP is then calculated as the total received power minus RSCP. Furthermore, ISCP can be separated into two components. One ISCP component is associated with the interference contribution from user signals in the group of user signals that are first decoded, regenerated, and subtracted. This interference contribution is denoted ISCP_ICpre, when measuring the contribution before interference cancellation, and ISCP_ICpost, when measuring the contribution after interference cancellation. The contribution can be calculated as the sum of RSCP over all users in the first group. The second interference contribution to ISCP, ISCP_nonIC, consists of thermal noise plus the received power of all other users except the RSCP of the considered user. With these definitions, the interference cancellation efficiency may be defined via the residual interference fraction (RIF), which is the ratio of the interference contribution after and before interference cancellation: RIF=ISCP_ICpost/ISCP_ICpre As explained above, the received signal before interference cancellation $r_{before}(t)$ is different than the received signal after interference cancellation $r_{after}(t)$ because interference has been removed using an interference cancellation method. The interference cancellation processing delays the handling of low data rate user signals and control channel signal (DPCCH). (Interference cancellation may not be used for all received signals, e.g., high data rate user signals. In this example, IC is only used for low data rate users). FIG. 4 is a detailed flowchart illustrating non-limiting, example procedures for a radio transceiver that uses interference cancellation (IC) for at least some received signals and that is part of a radio communication system that uses transmit power control (TPC).

The delay associated with interference cancellation is denoted by L. In the beginning of a time period (step A) at time t, the receiver's baseband processor 24 considers the control channel DPCCH portion of the received signal $r_{before}(t)$ and estimates the DPCCH's RSCP(t) on the received signal $r_{before}(t)$ before the interference cancellation (step B). Then, a segment of the received signal is put in storage, and the base station starts to decode symbols associated with a group of one or more users. The decoded symbols together with estimated radio signal characteristics are used to form replicas of the received signal associated with the user(s) in the considered group. The replica signals are subtracted from the signal in storage, and then the remaining users are considered. In this example, the time period L may be the length of the signal segment plus the time is takes to regenerate and subtract the signals associated with users in the first group. Furthermore, the baseband processor 24 retrieves a predicted effective interference power $I_{eff,pred}(t)$ predicted from one or more earlier time periods (step C) as explained further below. Then, the baseband processor 24 combines the received signal code power RSCP(t) and the predicted effective interference power $I_{eff,pred}(t)$ preferably in accordance with a first function $f_1$ to form a predicted SIR (step D):

$$SIR_{pred}(t)=f_1(RSCP(t), I_{eff,pred}(t))$$

One non-limiting example function $f_1$ is a ratio of received signal code power RSCP(t) and predicted effective interference power $I_{eff,pred}(t)$:

$$SIR_{prep}(t)=RSCP(t)/I_{eff,pred}(t)$$

Other first functions, simple or sophisticated, may be used. The predicted SIR ($SIR_{pred}(t)$ is compared to an SIR target, typically regularly adjusted in an outer power control loop, and a transmit power control (TPC) command is generated and sent to the mobile terminal (step E).

While this is ongoing, the interference cancellation in the baseband processor 24 is processing the received signal to cancel interference from other user signals sometimes referred to as connections (step F). The interference cancellation processing takes time, and after a time L, the interference is cancelled, and the receiver can estimate the SIR after interference cancellation SIP(t) (step G). The received signal code power RSCP(t) and the SINR(t) are combined in accordance with a second function $f_2$ to form the effective interference power estimate $I_{\mathit{eff}}(t)$ (step H):

$$I_{\mathit{eff}}(t)=f_2(RSCP(t),SIR(t))$$

One non-limiting example function $f_2$ is a ratio of the received signal code power RSCP(t) and SIR(t)

$$I_{\mathit{eff}}(t)=RSCP(t)/SIR(t)$$

Other second functions, simple or sophisticated, may be used.

A sequence of prior effective interference power estimates $I_{\mathit{eff}}(\tau)$, $\tau = \ldots, t$, may be used to predict the effective interference power estimate $I_{\mathit{eff,pred}}(t+L)$ at a time L in the future (step I). One non-limiting example predictor is:

$$I_{\mathit{eff,pred}}(t+L)=I_{\mathit{eff}}(t)$$

This predictor uses a prior effective interference power estimate, which though old and may be different than the current effective interference power, is nonetheless a reasonable estimate of the current effective interference power because the effective interference power is expected to change slowly. The effective interference power estimate $I_{\mathit{eff,pred}}(t+L)$ at a time L is stored for use during the next time period (step J) as the next predicted effective interference power $I_{\mathit{eff,pred}}(t)$ value used in step C.

In other non-limiting example embodiments, the effective interference power estimate may be predicted based on a signal model of the sequence of effective interference power estimates. Non-limiting example signal models include a linear model, a spline model, etc. Such models typically are fitted to past data, and based on the model and the past data, future signal values are predicted. Alternatively, the predicted effective interference power estimate can be based on estimated knowledge about unmodeled statistics. The effective interference power estimate predictor may be designed to minimize a certain parameter or certain parameters. For example, the effective interference power estimate predictor may minimize a mean squared prediction error given the signal model and statistics of the unmodeled variations. For linear models and Gaussian model imperfections, this may be implemented using a Kalman filter. The effective interference power estimate predictor may be updated based on effective interference power estimate prediction error evaluations at a later stage after the IC processing time L when the actual effective interference estimate becomes available.

Figure 5:
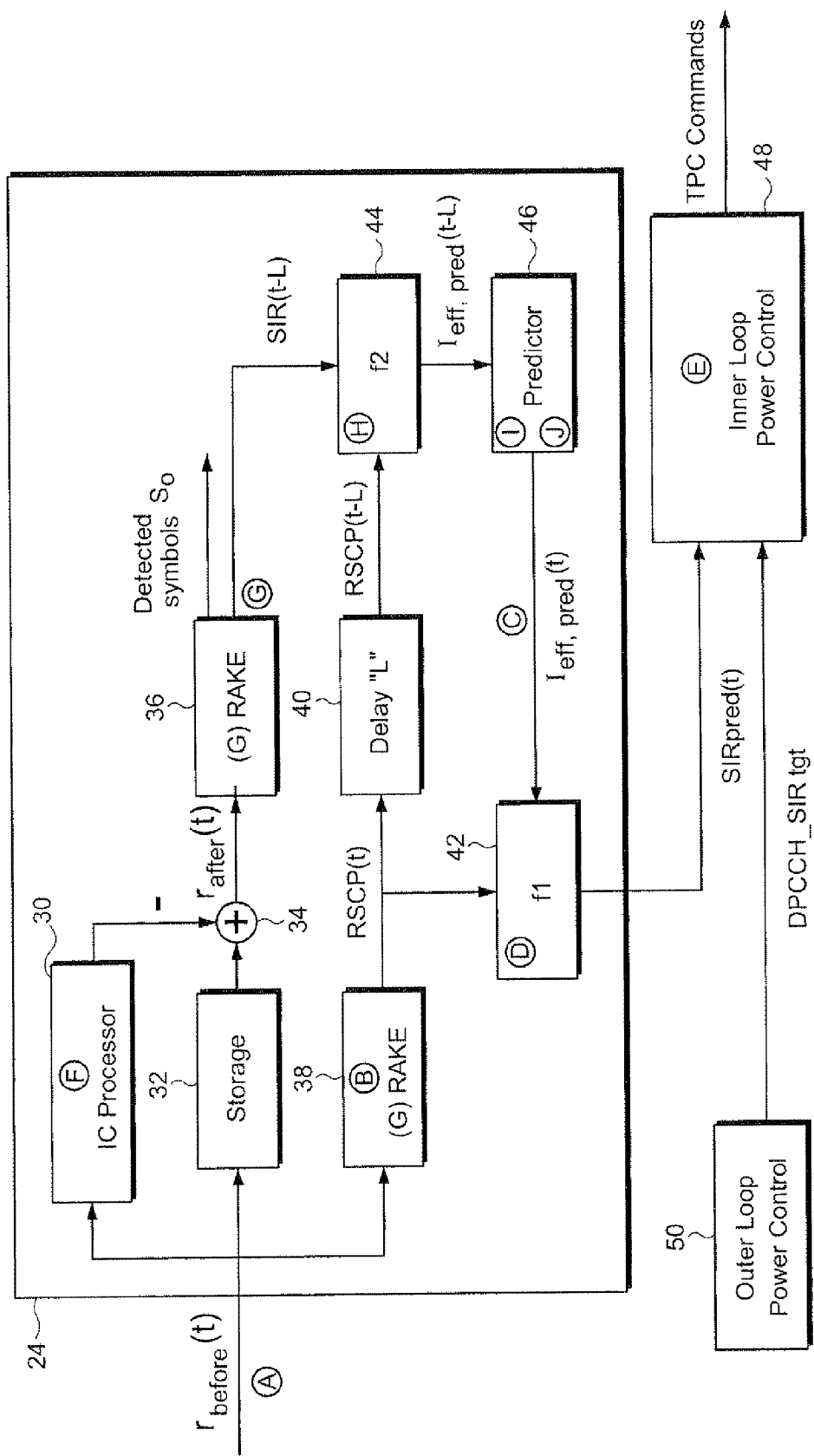
FIG. 5 is a non-limiting example function block diagram of a portion of a radio transceiver that uses interference cancellation (IC) and is part of a radio communications system that uses transmit power control (TPC) in accordance with the non-limiting, example procedures outlined in FIG. 4.

FIG. 5 is a non-limiting example function block diagram of a portion of a radio transceiver that uses interference cancellation (IC) and is part of a radio communications system that uses transmit power control (TPC) in accordance with the non-limiting, example procedures outlined in FIG. 4. Lettered steps from FIG. 4 are indicated in the baseband processor 24 to facilitate understanding.

The received signal $r_{\mathit{before}}(t)$ is provided to an IC processor 30 for interference cancellation. The interference cancellation scheme may be either successive interference cancellation, parallel interference cancellation, partial interference cancellation, one-stage successive interference cancellation, multi-user detection etc. The cancellation may be based on detected symbols and decoding information such as a cyclic redundancy check (CRC).

The received signal $r_{\mathit{before}}(t)$ is also stored in memory storage 32 and provided to a GRAKE 38 for processing as described above in conjunction with FIG. 6. The interference component of the received signal determined from the IC processor 30 is removed from the stored received signal $r_{\mathit{before}}(t)$ in combiner 34 to produce a received signal $r_{\mathit{after}}(t)$ The output of the GRAKE 38 is the estimated RSCP(t) of the DPCCH in the received signal $r_{\mathit{before}}(t)$ before the interference cancellation. That output estimated RSCP(t) is provided to a function $f_1$ processor 42 that operates on the estimated RSCP(t) and the predicted effective interference power $I_{\mathit{eff,pred}}(t)$ from the predictor 46 in accordance with a suitable function $f_1$. The output from block 42 is a predicted SIR that is provided to inner loop power controller 48 which compares the predicted SIR with a target value DPCCH_SIR tgt generated from an outer loop power control 50. The inner loop power controller 48 compares the two values and generates one or more appropriate TPC commands that are transmitted back to the mobile station.

The GRAKE 36 processes the interference-cancelled signal $r_{\mathit{after}}(t)$ and generates detected symbols $s_0$, which are passed on for further processing. The GRAKE 36 also generates an estimate of the SIR after interference cancellation SIR(t) that is provided to a second function processor 44 where the received signal code power RSCP(t) and the SIR(t) are combined in accordance with a second function $f_2$ to form the effective interference power estimate $I_{\mathit{eff}}(t)$. In this example implementation, the predictor 46 uses a sequence of prior effective interference power estimates $I_{\mathit{eff}}(\tau) \tau = \ldots, t$, to predict and store the effective interference power estimate $I_{\mathit{eff,pred}}(t+L)$ to be used in the next operation in the function $f_1$ processor 42 in the next processing time period.

The predictor 46 evaluates the prediction accuracy by comparing the predicted effective interference power estimate $I_{\mathit{eff,pred}}(t+L)$ to the effective interference power estimate $I_{\mathit{eff}}(t+L)$ when it becomes available for the same time period. Based on the evaluation, the predictor 46 can improve the prediction accuracy for subsequent time periods. In one non-limiting example, the predictor 46 uses a model estimated from a set of past effective interference power estimates, and the accuracy is measured as the absolute difference between the predicted and estimated effective interference powers $|I_{\mathit{eff,pred}}(t+L)-I_{\mathit{eff}}(t+L)|$. If this absolute difference is above a certain threshold, then the prediction model is reconsidered, and a new model is estimated from a new set of past effective interference power estimates.

Figure 7:
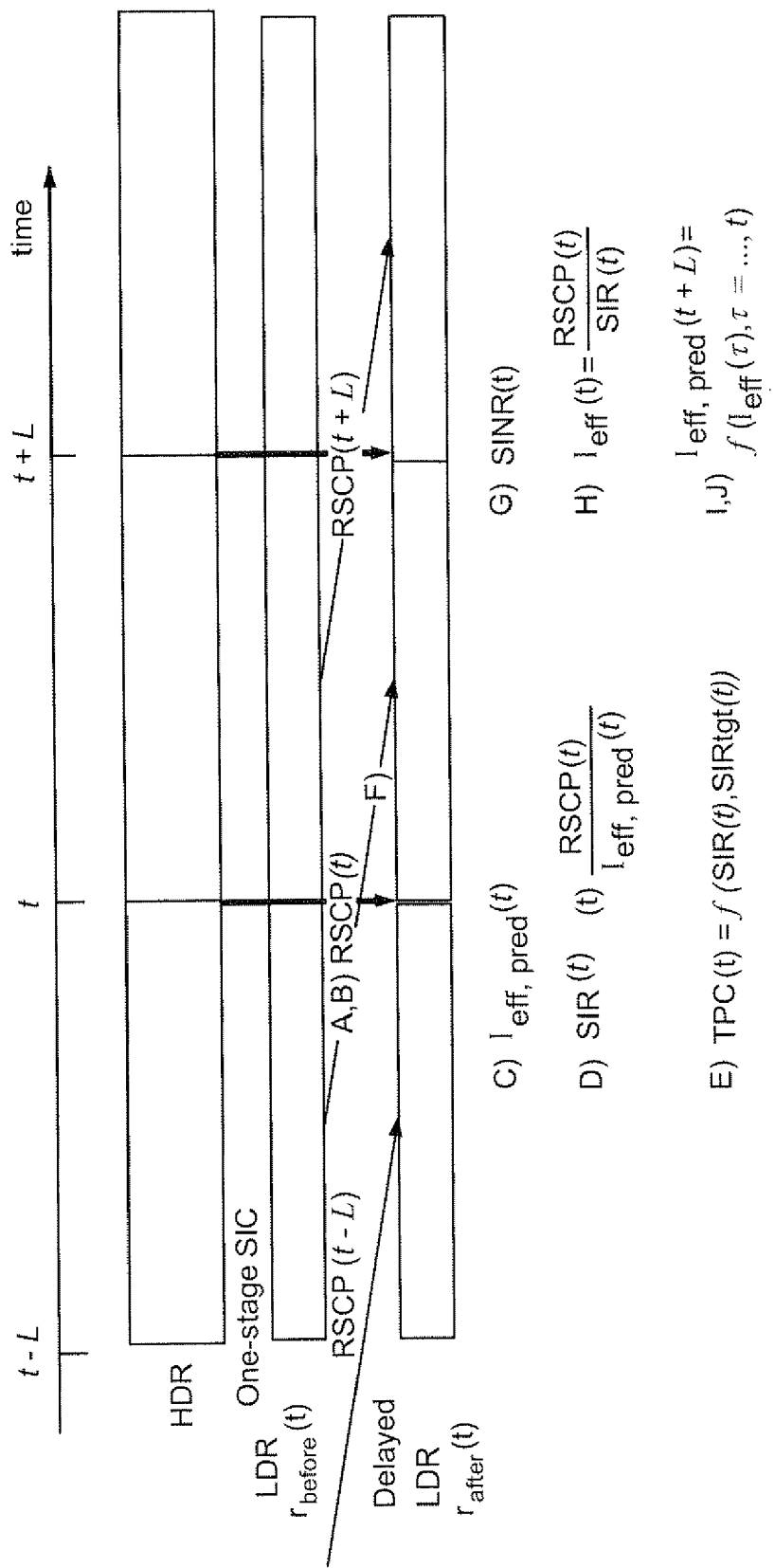
FIG. 7 is non-limiting example timing diagram to help illustrate the non-limiting example procedures outlined in FIG. 4.

FIG. 7 is a non-limiting example timing diagram for uplink TPC generation to help illustrate the non-limiting example procedures outlined in FIG. 4 and is also keyed to the lettered steps from FIG. 4. The time scale shows three consecutive time periods t−L, t, and t+L. For reference, a single high data rate (HDR) user is shown, and the HDR user belongs to the group of one or more users that are considered first before any IC is performed. However, the low data rate received (LDR) signals are processed using single stage, successive interference cancellation (SIC). The middle line shows the received LDR signal before IC, and the bottom line shows the received LDR signal after IC.

A practical non-limiting example is now described to illustrate the benefits achieved by this technology. Assume a cell operates at an average uplink interference power level of 11 N, where N is the thermal noise power. This means that 10N is the power of the received signal $r_{\mathit{before}}(t)$ which means that there is a rise over thermal (RoT) of 10 dB. Assume further that the contributions to this power come from one high data rate (HDR) user served by the cell received at a power of 6N. Moreover, assume there are 10 low data rate (LDR) service users that together contribute a power of 2N and that the received DPCCH level for each of them is 0.04N. In addition, there is a high data rate user in a different cell (Other) that contributes a power of 3N. The cell is assumed to use a one stage interference cancellation scheme that reduces the high data rate interference by a factor of 12. The remainder is denoted HDR+IC. Furthermore, assume a GRAKE is used when decoding the user signals in the cell, which reduces the other-cell high data rate user interference by a factor of 6, and the remainder is denoted Other, GRAKE. The result is that the low rate users experience an average effective interference power $I_{eff}=N+6N/12+3N/6+2N=4$ N. Furthermore, the spreading factor of DPCCH is 256, then the SIR after despreading is obtained by multiplying the SIR not including despreading by the spreading factor. Assume that the interference cancellation processing time L=1 time slot, e.g., 1/1500 seconds. These values will likely change over time, and in the example, four consecutive time slots are considered. The estimated RSCPs and the interference contributions HDR, HID+IC, Other, Other, GRAKE, LDR, Noise $I_{eff}$, and SIRs, are summarized in the following Table 1. Note that the $I_{eff}$ is the sum of the contributions after the receiver impact, i.e., the sum of HDR+IC, Other, GRAKE, LDR, and Noise (all emphasized with bold font in Table 1).

|  | Time | | | |
| --- | --- | --- | --- | --- |
|  | t − 3L | t − 2L | t − L | t |
| RSCP | 0.04N | 0.03N | 0.02N | 0.02N |
| HDR | 6N | 6.5N | 6N | 5.5N |
| HDR + IC | 0.5N | 0.5N | 0.5N | 0.5N |
| Other | 3N | 1.86N | 1.32N | 1.92N |
| Other, GRAKE | 0.5N | 0.31N | 0.22N | 0.32N |
| LDR | 2N | 1.99N | 1.98N | 1.98N |
| Noise | N | N | N | N |
| $I_{eff}$ | 4N | 3.8N | 3.7N | 3.8N |
| $SIR_{Actual}$ | 4.0824 | 3.0558 | 1.4107 | 1.2949 |

In this example, a simple predictor $I_{eff,pred}(t)=I_{eff}(t-L)$ is used produce the following prediction results for the predicted effective interference estimate and the predicted SIR in the following Table 2:

|  | Time | | |
| --- | --- | --- | --- |
|  | t − 2L | t − L | t |
| $I_{eff,pred}$ | 4N | 3.8N | 3.7N |
| $SIR_{pred}$ | 2.8330 | 1.2949 | 1.4107 |

This example shows that better performance is achieved by predicting the SIR via a predicted effective interference estimate rather then predicting SIR directly by using an outdated SIR value from a previous time period. For example, at time t−L, the true SIR is 1.41, the predicted SIR via effective interference is 1.29, while the predicted SIR by using the SIR of the previous time period is 2.83.

Figure 8:
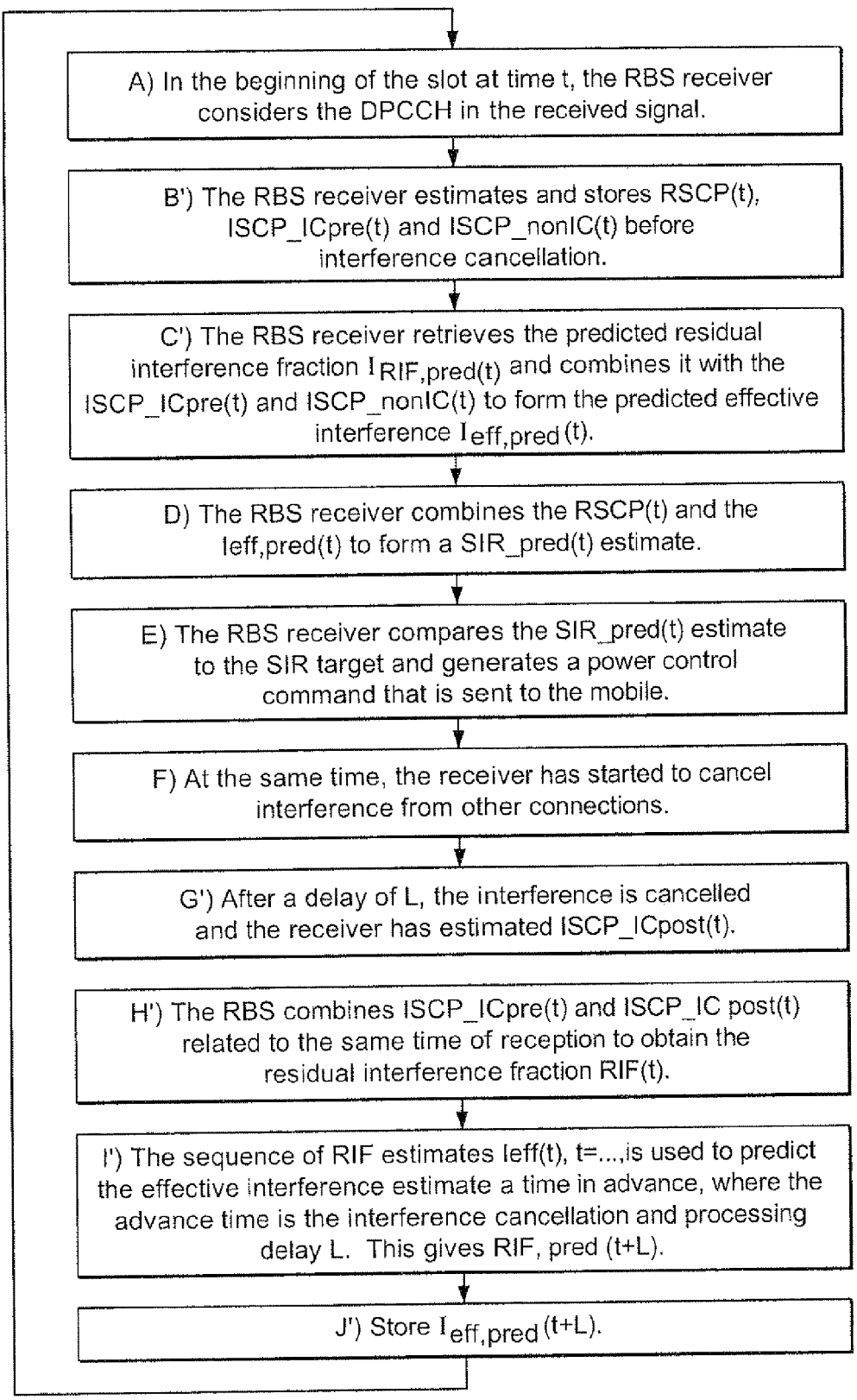
FIG. 8 is a detailed flowchart illustrating other non-limiting, example procedures for a radio transceiver that uses interference cancellation (IC) and is part of a radio communications system that uses transmit power control (TPC)

FIG. 8 is a detailed flowchart illustrating another embodiment as non-limiting, example procedures for a radio transceiver that uses interference cancellation (IC) for at least some received signals and that is part of a radio communication system that uses transmit power control (TPC). Here, the base station estimates the interference cancellation efficiency which is then used to predict the effective interference.

The delay associated with interference cancellation is denoted by L. In the beginning of a time period (step A) at time t, the receiver's baseband processor 24 considers the control channel DPCCH portion of the received signal $r_{before}(t)$ and estimates the DPCCH's RSCP(t) on the received signal $r_{before}(t)$ before the interference cancellation. Furthermore, also the interference contribution ISCP_ICpre(t) from user signals belonging to the group of users considered in the cancellation stage is estimated together with the interference contribution of all other users except the considered user (step B'). A segment of the received signal is then stored, and the base station starts to decode symbols associated with a group of users. The decoded symbols together with estimated radio signal characteristics are used to form replicas of the received signal associated with the users in the considered group. The replica signals are subtracted from the received signal in storage, and then the remaining users are considered. The time period L is essentially the length of the signal segment plus the time is takes to regenerate and subtract the signals associated to users in the first group.

The baseband processor 24 retrieves a predicted residual interference fraction $RIF_{pred}(t)$ predicted from one or more earlier time periods as explained further below. The baseband processor 24 then combines the received signal code power RSCP(t), the predicted residual interference fraction $RIF_{pred}(t)$, and the interference contributions ISCP_ICpre(t) and ISCP_nonIC(t) to form a predicted effective interference $I_{eff,pred}(t)$ using a non-limiting example function $g_2$ (step C').

In the next step D, the baseband processor 24 combines RSCP(t) and the predicted effective interference $I_{eff,pred}(t)$ preferably in accordance with a first function $f_1$ to form a predicted SIR:

$$SIR_{pred}(t)=f_1(RSCP(t),I_{eff,pred}(t))$$

One non-limiting example functions is a ratio of received signal code power RSCP(t) and predicted effective interference power $I_{eff,pred}(t)$:

$$SIR_{pred}(t)=RSCP(t)/I_{eff,pred}(t)$$

Other first functions, simple or sophisticated, may be used. The predicted SIR ($SIR_{pred}(t)$) is compared to an SIR target, typically regularly adjusted in an outer power control loop, and a transmit power control (TPC) command is generated and sent to the mobile terminal (step E).

While this is ongoing, the interference cancellation in the baseband processor 24 is processing the received signal to cancel interference from other user signals sometimes referred to as connections (step F). The interference cancellation processing takes time, and after a time L, the interference is cancelled, and the receiver can estimate the remaining interference contribution ISCP_ICpost(t) of the users in the first user group after interference cancellation (step G'). The baseband processor 24 combines the interference contributions after (ISCP_ICpost(t)) and before (ISCP_ICpre(t)) to estimate the residual interference fraction RIF(t) (step H'):

$$RIF(t)=ISCP\_ICpost(t)/ISCP\_ICpre(t)$$

This is one example of a non-limiting example function $g_1$.

A sequence of prior residual interference fraction estimates RIF(τ), τ= . . . , t, may be used to predict the residual interference fraction estimate $RIF_{pred}(t+L)$ at a time L in the future (step I'). One non-limiting example predictor is:

$$RIF_{pred}(t+L)=RIF(t)$$

This predictor uses a prior residual interference fraction estimate, which though old and may be different than the current residual interference fraction, is nonetheless a reasonable estimate of the current residual interference fraction because the residual interference fraction is expected to change slowly. The residual interference fraction estimate $RIF_{pred}(t+L)$ at a time L is stored for use during the next time period (step J') as the next predicted residual interference fraction $RIF_{pred}(t)$ value used in step C'.

In other non-limiting example embodiments, the residual interference fraction estimate may be predicted based on a signal model of the sequence of residual interference fraction estimates. Non-limiting example signal models include a linear model, a spline model, etc. Such models typically are fitted to past data, and based on the model and the past data, future signal values are predicted. Alternatively, the predicted residual interference fraction estimate can be based on estimated knowledge about unmodeled statistics. The residual interference fraction estimate predictor may be designed to minimize a certain parameter or certain parameters. For example, the residual interference fraction estimate predictor may minimize a mean squared prediction error given the signal model and statistics of the unmodeled variations. For linear models and Gaussian model imperfections, this may be implemented using a Kalman filter. The residual interference fraction estimate predictor may be updated based on residual interference fraction estimate prediction error evaluations at a later stage after the IC processing time L when the actual residual interference fraction estimate becomes available.

Figure 9:
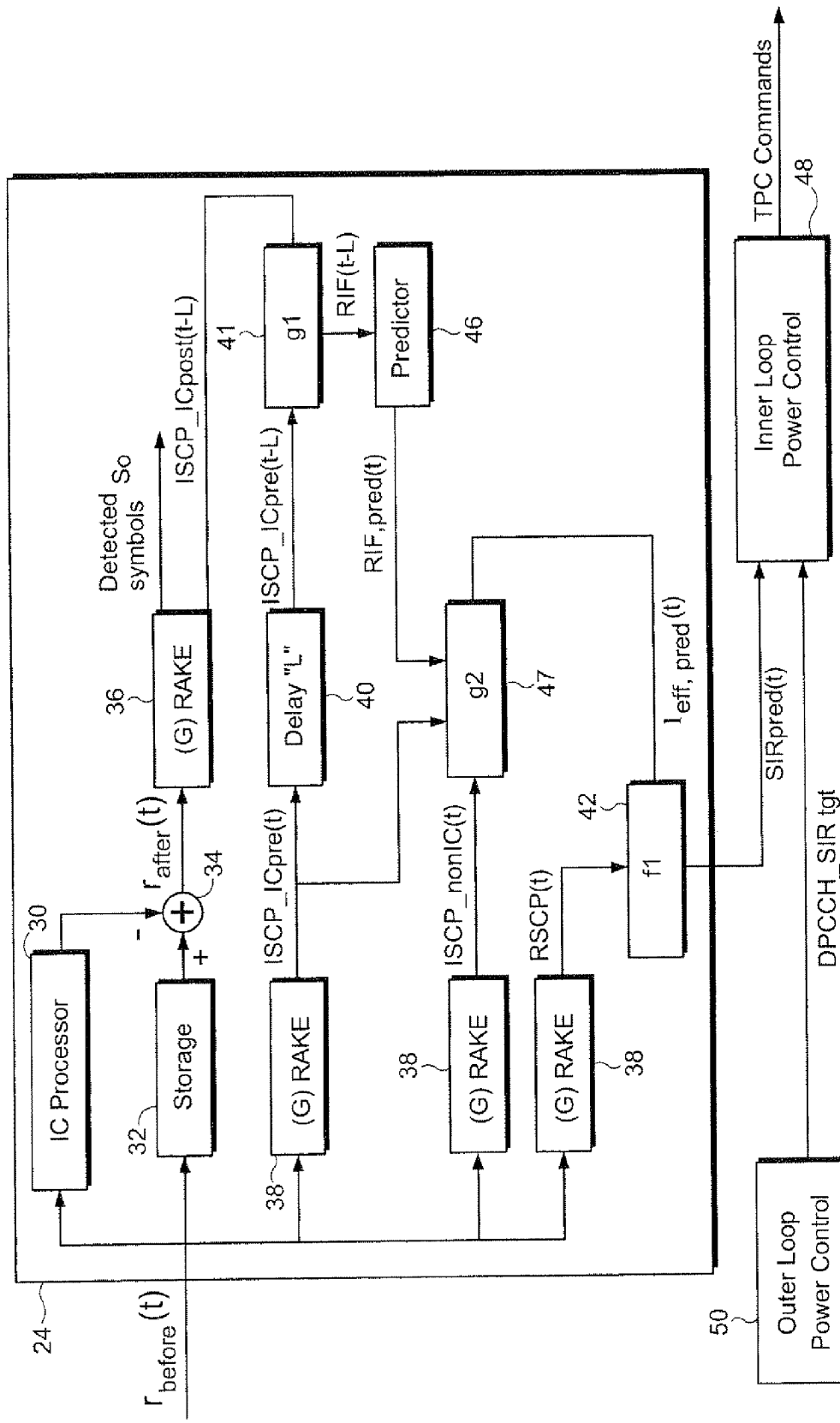
FIG. 9 is a non-limiting example function block diagram of a portion of a radio transceiver that uses interference cancellation (IC) and is part of a radio communications system that uses transmit power control (TPC) in accordance with the non-limiting, example procedures outlined in FIG. 8.

FIG. 9 is a non-limiting example function block diagram of a portion of a radio transceiver that uses interference cancellation (IC) and is part of a radio communications system that uses transmit power control (TPC) in accordance with the non-limiting, example procedures outlined in FIG. 8. The received signal $r_{before}(t)$ is provided to an IC processor 30 for interference cancellation. The interference cancellation scheme may be either successive interference cancellation, parallel interference cancellation, partial interference cancellation, one-stage successive interference cancellation, multi-user detection etc. The cancellation may be based on detected symbols and decoding information such as a cyclic redundancy check (CRC).

The received signal $r_{before}(t)$ is also stored in memory storage 32 and provided to a GRAKE 38 for processing as described above in conjunction with FIG. 6. The interference component of the received signal determined from the IC processor 30 is removed from the stored received signal $r_{before}(t)$ in combiner 34 to produce a received signal $r_{after}(t)$. The output of the first GRAKE 38 is the estimated interference ISCP_ICpre(t) of the received signal $r_{before}(t)$ before the interference cancellation which is delayed in delay 40 for a time period L associated with the IC processing to produce ISCP_ICpre(t−L).

The GRAKE 36 processes the interference-cancelled signal $r_{after}(t)$ and generates detected symbols $s_0$, which are passed on for further processing. The GRAKE 36 also generates an estimate of the interference contribution from the first user group after interference cancellation ISCP_ICpost(t−L) that is provided to a function processor 41 where the interference contributions after (ISCP_ICpost(t−L)) and before (ISCP_ICpre(t−L)) interference cancellation are combined in accordance with a first function $g_1$ to form the residual interference fraction estimate RIF(t−L). In this example implementation, the predictor 46 uses a sequence of prior residual interference fraction estimates $RIF(\tau), \tau = \ldots, t$, to predict and store the residual interference fraction estimate $RIF_{pred}(t)$ to be used in the next operation in the function $g_2$ processor 47 in the next processing time period.

The predictor 46 evaluates the prediction accuracy by comparing the predicted residual interference fraction estimate $RIF_{pred}(t+L)$ to the residual interference fraction estimate RIF(t+L) when it becomes available for the same time period. Based on the evaluation, the predictor 46 can improve the prediction accuracy for subsequent time periods. In one non-limiting example, the predictor 46 uses a model estimated from a set of past residual interference fraction estimates, and the accuracy is measured as the absolute difference between the predicted and estimated residual interference fractions $|RIF_{pred}(t+L)-RIF(t+L)|$. If this absolute difference is above a certain threshold, then the prediction model is reconsidered and a new model is estimated from a new set of past residual interference fraction estimates.

The function processor 47 processes the predicted residual interference fraction estimate $RIF_{pred}(t)$ from the predictor 46, the ISCP_ICpre(t) from the GRAKE 38, and an ISCP_nonIC(t) from a second GRAKE 38 to produce the predicted effective interference power $I_{eff,pred}(t)$. The output of a third GRAKE 38 is the estimated RSCP(t) of the DPCCH in the received signal $r_{before}(t)$ before the interference cancellation. That output estimated RSCP(t) is provided to a function $f_1$ processor 42 that operates on the estimated RSCP(t) and the predicted effective interference power $I_{eff,pred}(t)$ from the function g2 processor 47 in accordance with a suitable function $f_1$. The output from block 42 is a predicted SIRpred (t) that is provided to inner loop power controller 48 which compares the predicted SIRpred(t) with a target value DPCCH_SIR tgt generated from an outer loop power control 50. The inner loop power controller 48 compares the two values and generates one or more appropriate TPC commands that are transmitted back to the mobile station.

Figure 10:
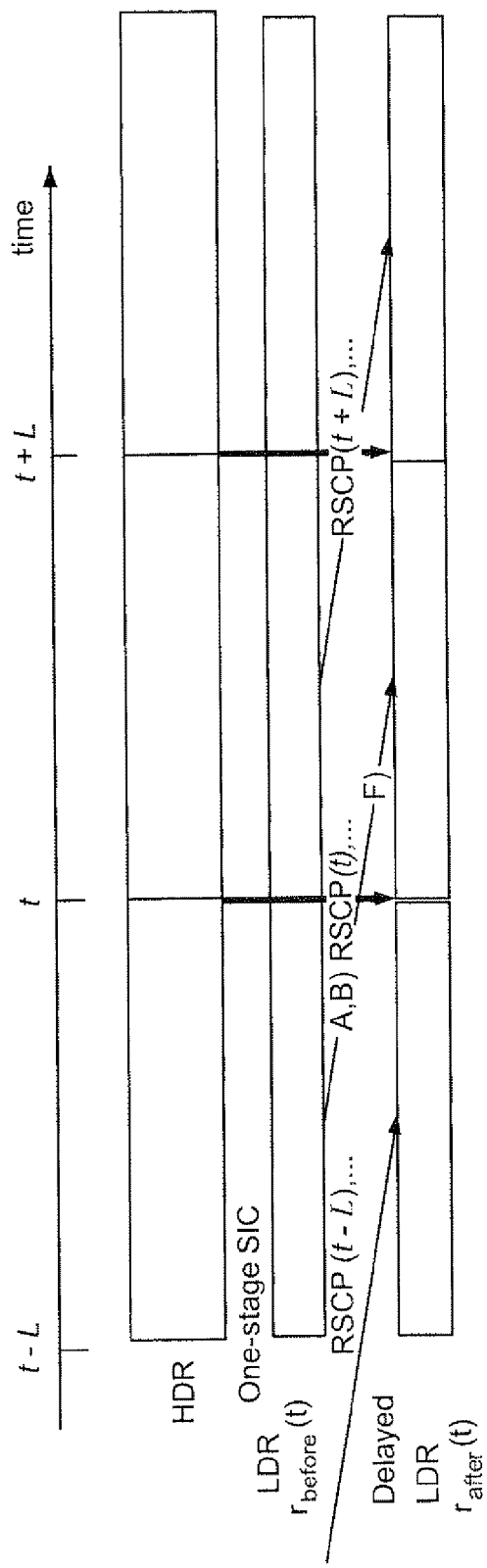
FIG. 10 is non-limiting example timing diagram to help illustrate the non-limiting example procedures outlined in FIG. 8.

FIG. 10 is a non-limiting example timing diagram for uplink TPC generation to help illustrate the non-limiting example procedures outlined in FIG. 8 and is also keyed to the lettered steps from FIG. 8. The time scale shows three consecutive time periods t−L, t, and t+L. For reference, a single high data rate (HDR) user is shown, and as mentioned above, the HDR user belongs to the group of users that are considered first. The low data rate received (LDR) signals are processed using single stage, successive interference cancellation (SIC). The middle line shows the received LDR signal before IC, and the bottom line shows the received LDR after IC.

When employing this embodiment to a practical non-limiting example, some quantities will have different values since the definitions of SIR and effective interference are different. The differences mean that the inner loop power control will operate with a different SIR target. Note that the $I_{eff}$ is the sum of the contributions after the receiver impact, i.e., the sum of ISCP_ICpre (HDR in the earlier example embodiment) times $RIF_{pred}(t)$ and ISCP_nonIC (which in turn is the sum of Other, LDR, and Noise) (all emphasized with bold font in Table 3 shown below).

$$I_{eff}(t) = ISCP\_ICpre(t) * RIF(t) + ISCP\_nonIC(t)$$

|  | Time | | | |
| --- | --- | --- | --- | --- |
|  | t − 3L | t − 2L | t − L | t |
| RSCP | 0.04N | 0.03N | 0.02N | 0.02N |
| ISCP_ICpre | 6N | 6.5N | 6N | 5.5N |
| ISCP_ICpost | 0.5N | 0.5N | 0.5N | 0.5N |
| RIF | 1/12 | 1/13 | 1/12 | 1/11 |
| Other | 3N | 1.86N | 1.32N | 1.92N |
| LDR | 2N | 1.99N | 1.98N | 1.98N |
| Noise | N | N | N | N |
| ISCP_nonIC | 6N | 4.85N | 4.3N | 4.9N |
| $I_{eff}$ | 6.5000 | 5.3500 | 4.8000 | 5.4000 |
| $SIR_{Actual}$ | 1.5754 | 1.4355 | 1.0667 | 0.9481 |

In this example, a simple predictor $RIF_{pred}(t)=RIF(t-L)$ is used produce the following prediction results for the predicted effective interference estimate and the predicted SIR in the following Table 4

$$I_{pred,eff}(t)=ISCP\_ICpre(t)*RIF_{pred}(t)+ISCP\_nonIC(t)$$

|  | Time | | |
| --- | --- | --- | --- |
|  | t − 2L | t − L | t |
| $I_{eff,pred}$ | 4.8917 | 4.2615 | 4.8583 |
| $SIR_{pred}$ | 1.5700 | 1.2014 | 1.0539 |

Again, predicting SIR via a RIF prediction is better practice than predicting SIR directly, exemplified at time t−L with true SIR 1.07, where the predicted SIR obtained via a predicted RIF is 1.20, while using a SIR from the previous time period would give 1.44.

One advantages with this technology is that the power control can better track the uplink path gain variations because RSCP(t) is considered in the TPC command generation with a minimum delay and the effective interference power is predicted to match the interference situation after interference cancellation has been performed in the current time period. Another advantage is that the benefits from interference cancellation are directly provided in the inner loop power control instead of relying on outer loop power control, which is much slower in convergence. This benefit makes it possible to track variations in the interference cancellation efficiency over time. The slow convergence of Outer loop power control (OLPC) when changing from one DPCCH_SIR target level to another means that the fast power control is less accurate. Without this technology, inner loop uplink power control requires a SIR estimate before interference cancellation in order to be able to send a power control command with a minimum delay to reduce power control performance degradation caused as delays increase. This means that the DPDCH (or E-DPCCH and E-DPDCH) experience different amount of interference, which prevents universal power offsets. With this technology, it is possible to design universally applicable power offsets.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method implemented in a radio receiver communicating in a radio communications system, comprising:
    determining a signal power associated with a signal received in a current time period;
    combining the determined signal power with a predicted interference predicted based on an interference estimated for a previously received signal received in a previous time period to determine a predicted signal-to-interference indicator;
    comparing the predicted signal-to-interference indicator to a target signal-to-interference indicator; and
    generating a transmit power control command based on the comparison.

2. The method in claim 1, wherein the predicted signal-to-interference indicator is determined by dividing the determined signal power by the predicted interference.

3. The method in claim 1, wherein the predicted signal-to-interference indicator includes one of the following: predicted signal-to-interference ratio (SIR), predicted signal-to-interference plus noise ratio (SINR), and predicted carrier-to-interference ratio (C/I).

4. The method in claim 1, wherein the radio receiver uses interference cancellation.

5. The method in claim 1, further comprising:
    during the current time period, performing interference cancellation on the received signal for the current time period;
    determining an estimated signal-to-interference indicator based on the received signal after interference cancellation for the current time period;
    combining the estimated signal-to-interference indicator and the determined received signal power to determine an effective interference estimate for the current time period; and
    using the effective interference estimate for the current time period as the predicted interference for a next time period.

6. The method in claim 5, further comprising:
    storing a sequence of effective interference estimates for multiple time periods, and
    using the sequence of effective interference estimates for multiple time periods as the predicted interference for a next time period.

7. The method in claim 5, further comprising:
    generating a model using a sequence of effective interference estimates for multiple time periods, and
    using the model to predict the interference for a next time period.

8. The method in claim 5, further comprising:
    evaluating a prediction accuracy by comparing the predicted interference for the next time period to an effective interference estimate for the next time period, and
    making a prediction adjustment based on the prediction accuracy.

9. The method in claim 5, wherein the combining of the estimated signal-to-interference indicator and the determined received signal power includes dividing the determined received signal power by the estimated signal-to-interference indicator.

10. The method in claim 5, wherein the predicted interference for the current time period and determined received signal power for the current time period are combined to determine the predicted signal-to-interference indicator for the current time period in accordance with a first function, and wherein the estimated signal-to-interference indicator for the previous time period and the determined received signal power for the current time period are combined in accordance with a second function to determine the predicted interference.

11. The method in claim 1, further comprising:
during the current time period, performing interference cancellation on the received signal for the current time period;
determining a first estimated interference indicator associated with signals subject to interference cancellation based on the received signal before interference cancellation for the current time period;
determining a second estimated interference indicator associated with signals subject to interference cancellation based on the received signal after interference cancellation for the current time period;
combining the first and second estimated interference indicators to calculate a residual interference fraction for the current time period;
using the calculated residual interference fraction for the current time period as a predicted residual interference fraction for the next time period; and
combining the first estimated interference indicator for the next time period, the predicted residual interference fraction for the next time period, and an estimated interference associated with signals that are not subject to interference cancellation for the next time period to determine a predicted effective interference for the next time period.

12. The method in claim 10, further comprising:
storing a sequence of residual interference fractions for multiple time periods, and
using the sequence of residual interference fraction for multiple time periods to calculate the predicted residual interference fraction for a next time period.

13. The method in claim 10, further comprising:
generating a model using a sequence of residual interference fractions for multiple time periods, and
using the model to predict the residual interference fraction for a next time period.

14. The method in claim 10, further comprising:
evaluating the prediction accuracy by comparing the predicted residual interference fraction for the next time period to an residual interference fraction estimate for the next time period, and
making a prediction adjustment based on the prediction accuracy.

15. The method in claim 10, wherein the combining of the estimated interference indicator associated with signals subject to interference cancellation based on the received signal after interference cancellation and an estimated interference indicator associated with signals subject to interference cancellation based on the received signal before interference cancellation includes dividing the determined estimated signal-to-interference indicator and the determined received signal power includes dividing the determined interference indicator associated with signals subject to interference cancellation based on the received signal after interference cancellation by the determined interference indicator associated with signals subject to interference cancellation based on the received signal before interference cancellation.

16. The method in claim 10, wherein the predicted residual interference fraction for the current time period, the first estimated interference indicator for the current time period, and the estimated interference for signals not subject to interference cancellation for the current time period are combined to determine the predicted effective interference for the current time period in accordance with a first function, and wherein the determined received signal power for the current time period and the predicted effective interference for the current time are combined in accordance with a second function to determine the predicted signal-to-interference indicator.

17. Apparatus for use in a radio receiver communicating in a radio communications system, comprising electronic circuitry configured to:
determine a signal power associated with a signal received in a current time period;
combine the determined signal power with a predicted interference predicted based on an interference estimated for a previously received signal received in a previous time period to determine a predicted signal-to-interference indicator;
comparing the predicted signal-to-interference indicator to a target signal-to-interference indicator; and
generate transmit power control command based on the comparison.

18. The apparatus in claim 17, wherein the electronic circuitry is configured to determine the predicted signal-to-interference indicator by dividing the determined signal power by the predicted interference.

19. The apparatus in claim 17, wherein the electronic circuitry is configured to perform interference cancellation on some portion of the received signal.

20. The apparatus in claim 17, wherein the electronic circuitry is configured to:
during the current time period, perform interference cancellation on the received signal for the current time period;
determine an estimated signal-to-interference indicator based on the received signal after interference cancellation for the current time period;
combine the estimated signal-to-interference indicator and the determined received signal power to determine an effective interference estimate for the current time period; and
use the effective interference estimate for the current time period as the predicted interference for a next time period.

21. The apparatus in claim 20, wherein the electronic circuitry is configured to:
store a sequence of effective interference estimates for multiple time periods, and
use the sequence of effective interference estimates for multiple time periods as the predicted interference for a next time period.

22. The apparatus in claim 20, wherein the electronic circuitry is configured to:
generate a model using a sequence of effective interference estimates for multiple time periods, and
use the model to predict the interference for a next time period.

23. The apparatus in claim 20, wherein the electronic circuitry is configured to:
combine the predicted interference for the current time period and determined received signal power for the current time period to determine the predicted signal-to-interference indicator for the current time period in accordance with a first function, and
combine the estimated signal-to-interference indicator based on the previous time period and the determined received signal power for the current time period in accordance with a second function to determine the predicted interference.

24. The apparatus according to claim 17, wherein the electronic circuitry is configured to:

during the current time period, perform interference cancellation on the received signal for the current time period;

determine a first estimated interference indicator associated with signals subject to interference cancellation based on the received signal before interference cancellation for the current time period;

determine a second estimated interference indicator associated with signals subject to interference cancellation based on the received signal after interference cancellation for the current time period;

combine the first and second estimated interference indicators to calculate a residual interference fraction for the current time period;

use the calculated residual interference fraction for the current time period as a predicted residual interference fraction for the next time period; and combine the first estimated interference indicator for the next time period, the predicted residual interference fraction for the next time period, and an estimated interference associated with signals that are not subject to interference cancellation for the next time period to determine a predicted effective interference for the next time period.

25. The apparatus according to claim 24, wherein the electronic circuitry is configured to:

combine the predicted residual interference fraction for the current time period, the first estimated interference indicator for the current time period, and the estimated interference for signals not subject to interference cancellation for the current time period to determine the predicted effective interference for the current time period in accordance with a first function, and combine the determined received signal power for the current time period and the predicted effective interference for the current time in accordance with a second function to determine the predicted signal-to-interference indicator.

26. The apparatus according to claim 17 implemented in a radio receiver.

27. The apparatus according to claim 17 implemented in a base station configured to operate in a cellular radio communications system.

* * * * *

UNITED STATES PATENT AND TRADEMARK OFFICE
CERTIFICATE OF CORRECTION

PATENT NO. : 7,856,243 B2
APPLICATION NO. : 11/951113
DATED : December 21, 2010
INVENTOR(S) : Gunnarsson et al.

It is certified that error appears in the above-identified patent and that said Letters Patent is hereby corrected as shown below:

On the Title Page, in Field (73), under "Assignee", in Column 1, Line 1, delete "Ericsson," and insert -- Ericsson (publ), --, therefor.

In Fig. 4, Sheet 4 of 10, in Box "D)", in Line 2, delete "Ieff,pred(t)" and insert -- $I_{eff,pred}(t)$ --, therefor.

In Fig. 6, Sheet 6 of 10, delete " 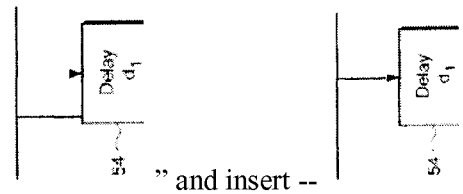 " and insert -- --, therefor.

In Fig. 7, Sheet 7 of 10, delete " $SIR(t)$ D) " and insert -- $SIR(t)=$ D) --, therefor.

In Fig. 8, Sheet 8 of 10, in Box "D)", in Line 2, delete "Ieff,pred(t)" and insert -- $I_{eff,pred}(t)$ --, therefor.

In Fig. 8, Sheet 8 of 10, in Box "I')", in Line 1, delete "Ieff(t), t=...," and insert -- $I_{eff}(\tau)$, $\tau=...,t$ --, therefor.

In Fig. 9, Sheet 9 of 10, delete "So" and insert -- $S_0$ --, therefor.

In Column 6, Line 3, delete "ill" and insert -- in --, therefor.

In Column 7, Line 21, delete "so" and insert -- $s_0$ --, therefor.

Signed and Sealed this
Twenty-fifth Day of October, 2011

David J. Kappos
*Director of the United States Patent and Trademark Office*

CERTIFICATE OF CORRECTION (continued)
U.S. Pat. No. 7,856,243 B2

In Column 8, Line 54, delete "$SIR_{prep}(t)$" and insert -- $SIR_{pred}(t)$ --, therefor.

In Column 8, Line 57, delete "$(SIR_{pred}(t)$" and insert -- $(SIR_{pred}(t))$ --, therefor.

In Column 8, Line 67, delete "$SIP(t)$" and insert -- $SIR(t)$ --, therefor.

In Column 9, Line 4, delete "$f_2(RSCP)t),SIR(t))$" and insert -- $f_2(RSCP(t),SIR(t))$ --, therefor.

In Column 9, Line 67, delete "$r_{after}(t)$" and insert -- $r_{after}(t)$. --, therefor.

In Column 10, Line 23, delete "$I_{eff}(\tau)\ \tau=$" and insert -- $I_{eff}(\tau), \tau=$ --, therefor.

In Column 11, Line 14, delete "HID+IC," and insert -- HDR+IC, --, therefor.

In Column 12, Line 28, delete "$f_1(RSCP)(t),I_{eff,pred}(t)$" and insert -- $f_1(RSCP(t),I_{eff,pred}(t))$ --, therefor.

In Column 12, Line 29, delete "is" and insert -- $f_1$ is --, therefor.